: 3,165,565
METHOD OF MAKING HOLLOW ARTICLES
Alvon R. Cox and Albert E. Hosier, Ashland, Ohio, assignors to The Faultless Rubber Company, Ashland, Ohio
Filed June 17, 1960, Ser. No. 37,007
9 Claims. (Cl. 264—161)

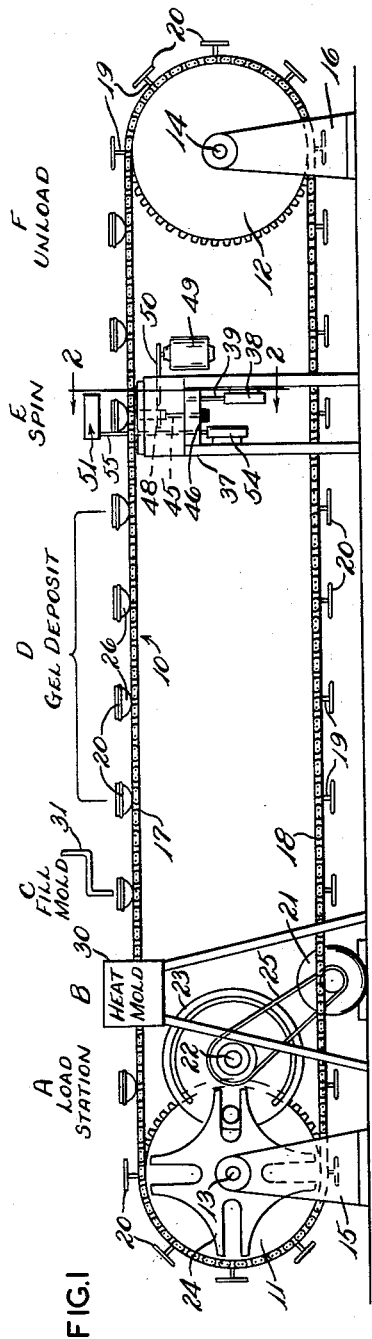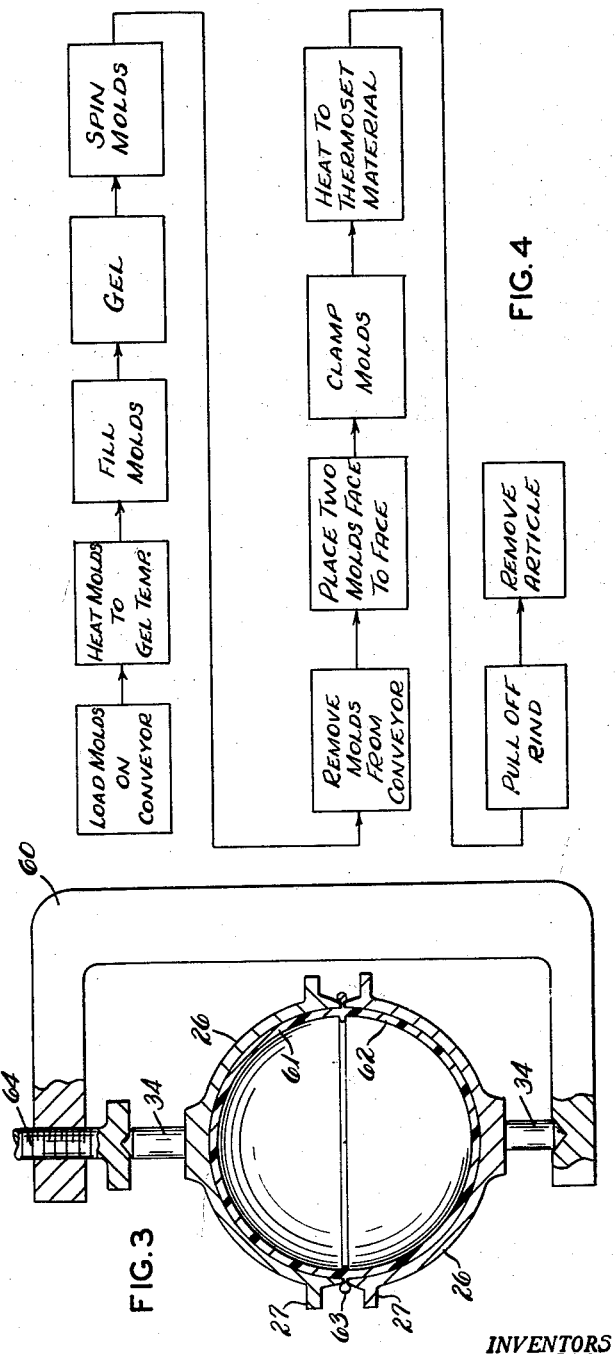
FIG. 1
FIG. 3
FIG. 4
INVENTORS
ALVON R. COX
ALBERT E. HOSIER
BY
ATTYS.

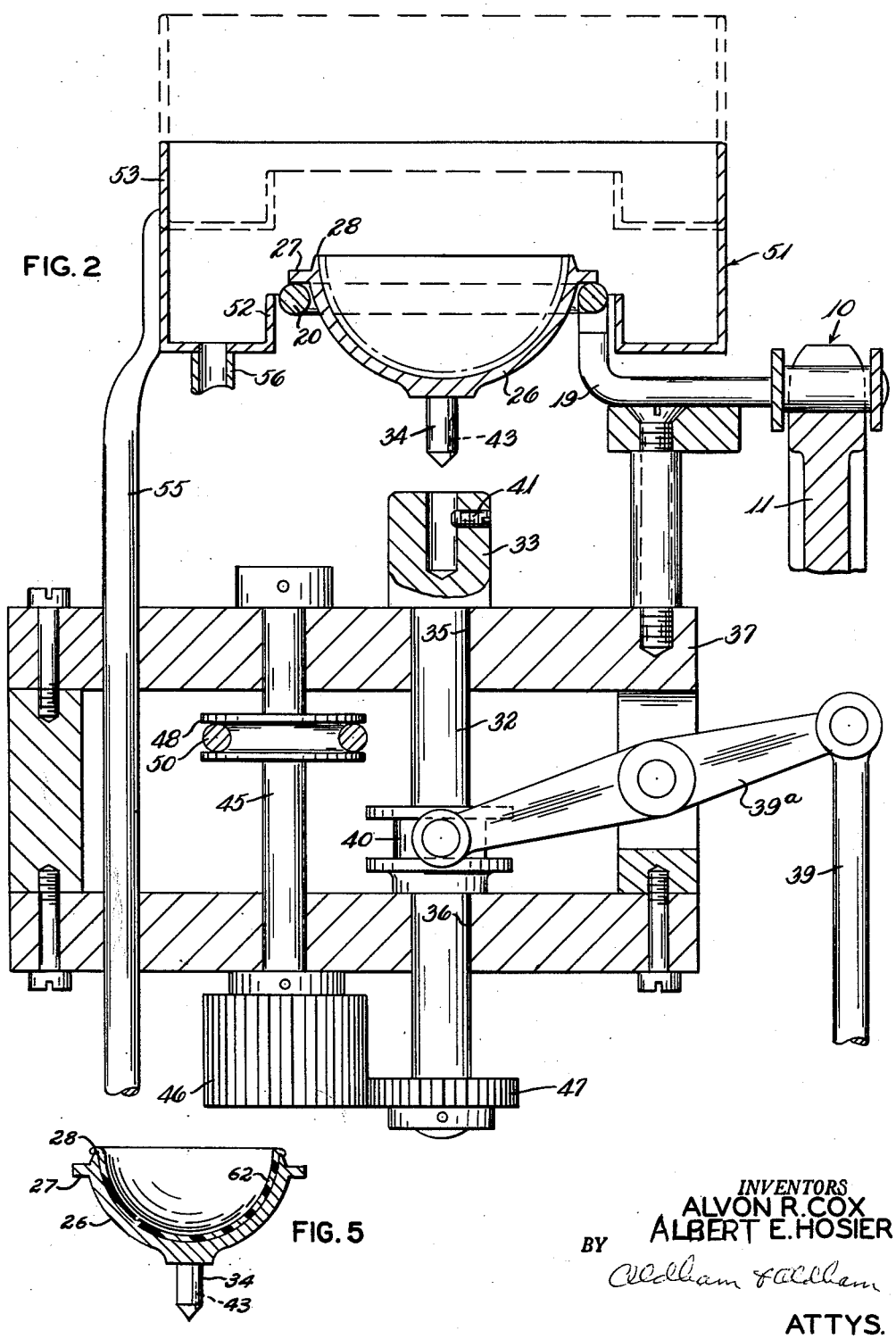

This invention relates to the manufacture of hollow articles from plastisol or a thermosetting dispersion of plastic material and is especially useful in the manufacture of hollow spherical or ellipsoidal articles such as balls or bulbs.

Heretofore hollow bulbs and balls have been produced by placing in a two-part mold a quantity of plastisol sufficient to provide a coating of the desired thickness, rotating the mold about a plurality of axes while heating the mold to deposit and gel the material and finally to thermoset the deposited material and then cooling the mold and removing the molded article. Such methods required the use of complicated and expensive machinery and did not always produce a satisfactory article.

It has also been the practice to make some hollow articles by a slush molding process in which a mold was filled with plastisol, a coating was deposited on the mold surfaces by heating the mold, and the excess plastisol was poured out. Then the article was thermoset by further heating of the mold. While this process was used to make bottles and toys having an open end, it could not be used for making closed articles such as balls.

It is an object of the present invention to overcome the difficulties of the foregoing methods and to provide a successful method of making closed hollow articles.

It is a further object to provide for making a closed hollow article by forming and uniting two complementary parts, joining them together while they are still in the molds and thermosetting the closed article within the molds.

Another object of the invention is to remove excess plastisol from a hemispherical mold cavity after deposit of a wall of gelled material therein by a rapid spinning of the mold on its vertical axis.

These and other objects will appear from the following description and the accompanying drawings forming a part hereof.

Of the drawings,
FIG. 1 is a side elevation of apparatus which may be used in practicing the invention.
FIG. 2 is a sectional view thereof taken on line 2—2 of FIG. 1, parts being broken away and parts shown in section.
FIG. 3 is a cross-sectional view of two mold members with the deposited material therein and a clamp for pressing them together.
FIG. 4 is a diagram showing the steps of the method.
FIG. 5 is a sectional view of one of the mold members with the gelled plastisol deposited therein after the excess has been spun out.

Referring to the drawings which show one form of apparatus that may be employed in practicing the invention, the invention contemplates providing complementary mold members which in the case of a spherical article would be of hemispherical shape and would meet in a common great circle plane, placing the mold members with their cavities facing upwardly on a suitable support such as a conveyor, heating the mold members to the gelling temperature of the plastisol, filling the mold members to the brim, allowing the plastisol to gel and deposit over the mold surface, rotating or spinning the mold about a vertical axis to throw out the undeposited plastisol, placing two mold members face to face and clamping them together to unite the gelled plastisol deposits, heating the clamped mold members to a temperature to set the united deposits, further removing the rind formed by squeezing out of excess material at the joint, and removing the article from the mold. While the apparatus for conveying the mold members may include various forms of conveying apparatus preferably movable step by step from station to station, for the purpose of illustration a chain type conveyor 10 has been illustrated as trained about a pair of sprockets 11, 12 supported upon parallel horizontal shafts 13, 14 rotatable in pedestal bearings 15, 16. In this form of conveyor the upper reach 17 supports the work and the lower reach 18 is a return reach. Obviously the conveyor sprockets might be supported on horizontal shafts if desired. Mounted on the conveyor at regularly spaced intervals are L-shaped support members 19 whose horizontal legs are secured to the conveyor and whose vertical legs hold supoprting rings 20 horizontally.

Any desirable mechanism may be employed to move the conveyor step by step, and for illustrative purposes an electric motor 21 has been shown as driving a jack shaft 22 which carries the single tooth gear 23 of a Geneva stop motion, the star wheel 24 of which is fixed to the conveyor drive shaft 13, the gear 23 being driven by a chain or belt 25. The arrangement is such that the single tooth of the gear 23 enters the slots of the star wheel in succession to rotate shaft 13 at intervals and between movements locks the conveyor against movement.

The hemispherical cavity mold members 26, as seen in FIG. 2, have substantially uniform wall thickness and have a lateral circumferential flange 27 near their greatest diameter but spaced therefrom and from the upper plane of the mold by a substantial amount to provide a narrow land 28 about the cavity mouth preferably about one-sixteenth of an inch wide, the outer face adjacent the land being conically diverging downwardly toward the flange 27. The flange 27 is of such size as to overlie the ring 20 and to be centered therein. This enables an operator to place the mold members in succession in the rings with the cavities facing upwardly as shown in FIGS. 1 and 2.

The operator places the mold members on rings 20 at station A and they are conveyed to station B where heating means such as an oven 30 which surrounds the mold member heats the empty mold member to a temperature sufficient to gel the material in contact therewith in the desired time depending upon the thermosetting material and the thickness of deposit required, for example the mold members may be heated to a gel temperature of about 250 degrees F.

As the molds are conveyed to station C, one at a time, they pass under a filling spout 31 where each is filled to the brim with plastisol. Thereafter the molds are conveyed for some space designated station D and the heat stored in the mold members causes the plastisol adjacent the metal mold surface to gel and deposit thereon.

As the mold members arrive and dwell at the spin station E, the mold members are spun rapidly about a vertical axis to throw out the undeposited plastisol. For this purpose, a vertically movable and rotatable spindle 32 centered below the mold member has an upwardly open chuck 33 adapted to engage over a central dependent drive pin 34. As a mold member arrives at the station aligned with the spindle, the spindle which is slidably and rotatively mounted in bearings 35, 36 in a stationary frame 37, is raised by means such as a fluid pressure operated cylinder 38 connected to push rod 39 and a rocker arm 39a pivotally mounted on frame 37 and engaging a shift collar 40 on the spindle. The pin 34 may be tapered to facilitate its entry and the pin and socket may have positive driving means such as the key screw 41 and cooperating groove 43.

For spinning the spindle 32 a jack shaft 45 is rotatably journalled in the frame 37 parallel thereto. Shaft 45 carries a wide face gear 46 which meshes with a gear 47 on shaft 32 at any vertical position of the shaft. Shaft 45 also has a grooved pulley 48 fixed thereto driven by a motor 49 through a belt 50. Cylinder 38 may be operated by a hand operated valve or in any other manner.

As the mold member is spun about a vertical axis, excess plastisol which has not deposited and gelled on the walls is thrown out centrifugally and must be collected for reuse. For this purpose, an annular catch basin 51 of U-shape in cross section at any radius is provided and has an inner circular wall 52 of such diameter as to clear the rotating mold and of such height as to uncover the top edge of the mold in its receiving position shown in full lines in FIG. 2. The outer wall 53 is higher than the inner wall so as to catch radially thrown material. As in the dotted line position of FIG. 2 the catch basin is raised above the mold member to allow travel of the conveyor.

For manipulating the catch basin, the fluid pressure cylinder 54 may be positioned on frame 37 and its piston connected by a rod 55 with the catch basin. The rod slides vertically in suitable bearings of frame 37 and the cylinder may be operated to raise and lower the catch basin by any desired valve means by hand or otherwise operated.

The catch basin has an outlet pipe 56 which may be connected by a flexible hose (not shown) to a convenient container for receiving the plastisol for reuse.

In the raised position of the catch basin and lowered position of the spindle 32 the conveyor 10 may move the mold members therebetween step by step without interference. When a mold member stops at the spinning station, the catch basin 51 is lowered thereabout, then spindle 32 is raised to engage and drive the mold member. After the excess plastisol has been thrown out, the spindle 32 is lowered, the catch basin 51 is raised clear of the mold member and the conveyor advances the mold member laterally from the spin station.

At the next station, an operator removes the coated mold member 26 from the conveyor. Two such coated mold members are then placed face to face as shown in FIG. 3 and a clamp 60 is applied thereto to adhere the deposits 61, 62 to each other, any excess material being squeezed out beyond the narrow meeting lands 28 of the mold to provide a rind 63. An ordinary C-clamp 60 having a pressure screw 64 or any other clamping means may be employed for providing pressure to the mold members.

While the mold members are clamped together about the deposited material they are placed in an oven or other heating means and are heated to the thermosetting temperature of the thermosetting material, usually to about 350° F. Thereafter, any rind formed is torn off the assembled mold members. Thereafter the molds are cooled and opened and the articles removed therefrom.

It is important to note that the mold 26 at the spin-out station still has appreciable heat therein. In fact the gel stations shown may be enclosed to prevent rapid loss of heat from the molds, or the molds may even be reheated immediately prior to the spin-out station. In all events, even with a rapid spin-out of excess plastisol at the mold emptying station, some of such liquid flowing over the lands 28 will be gelled to provide a web, or integral, outwardly flared lip that is formed with each ball section deposit 61 and 62. These lips or webs are soft and when clamped together some of such material flows inwardly of the molds to form a reenforcing bead 65 in the ball 66 produced by practice of the invention. Thus the connection between the original sections of the ball is ultimately stronger than other portions of the ball.

The novel ball 66 of the invention may be finished, if desired, by conventional inflation and painting operations. A sealing mass may be placed within one ball section, if necessary, prior to assembly of the two molds to facilitate later inflation of the ball.

By filling the mold members 26 to the brim with plastisol, a uniform thickness deposit is obtained. Also, such filling of the molds aids in obtaining flow of the thermosetting material uniformly over the mold lands to obtain a deposit of material over the lands when the molds are emptied.

Heat may be supplied to the mold members at station D, or at any time after their filling, if a preheat of the mold members is not desired, or if excessive heat loss occurs in a preheated mold.

It should be noted that any suitable valve may be used in the balls, and one novel valve which is suitable is shown and described in Alvon R. Cox application Serial No. 33,787.

The mold members are spun quite rapidly on their vertical axes by the means engaging them at the discharge station. About 600 to 900 r.p.m.'s are normally used but speeds of as low as 100 or as high as 1500 may be used. With high viscosity plastisol, the higher rotational speeds are required and with low viscosity material, the lower rotational speeds may be used. The spin out of material over the heated lands provides a uniform gelled lip on the deposited plastic and leaves no ribs or unevenness in the layer of plastic formed over the mold cavity.

In some instances, it may be desirable to cause the liquid plastisol in the molds to flow therefrom by inserting a cold, smooth surfaced member complementary to the inner surface of the gelled deposit in a mold member into such member to force the excess material therefrom.

From the foregoing it will be seen that a novel, improved method and apparatus have been provided to form hollow articles and that an improved article is obtained. Hence the objects of the invention have been achieved.

While a certain embodiment and details have been shown to illustrate the invention, it will be understood by those skilled in the art that various modifications may be made without departing from the scope of the invention as it is defined by the following claims.

What is claimed is:

1. The method for making hollow articles from a liquid dispersion of thermosetting material which comprises providing complementary mold members having mating cavities and narrow meeting lands about the cavities, heating the mold members to the gelling temperature of the thermosetting material, filling each mold member to the brim with the liquid thermosetting material, depositing the material over the mold cavity surface, removing the excess undeposited liquid material from the mold members by flowing it uniformly over the mold lands to form a gelled deposit thereon, assembling the mold members and the deposited material face to face to unite the deposits, applying pressure to the assembled mold members to squeeze excess material out of the space between lands of the molds, heating the assembled molds to the thermosetting temperature of the material to further set the material forming the hollow articles, cooling the molds, removing the clamping pressure, opening the molds, and removing the articles.

2. The method for making hollow articles from a liquid dispersion of thermosetting material which comprises providing complementary mold members having mating cavities and narrow meeting lands about the cavities, heating the mold members to the gelling temperature of the thermosetting material, filling each mold member when open and having upwardly open mold cavities to the brim with the liquid thermosetting material, depositing the material over the mold cavity surface by transfer of heat in the mold member to the thermosetting material in the member adjacent the cavity surface, removing the excess undeposited material from the mold members by at least substantially uniform flow over the mold brims, assembling the mold members and the deposited material face to face to unite the deposits, applying pressure to the assembled mold members to squeeze excess material out of the space between lands of the molds, heating the assembled molds to a temperature to further set the material forming the hollow article, cooling the mold and thus the article therein, removing the clamping pressure, opening the molds, and removing the articles.

3. The method for making hollow articles from a liquid dispersion of thermosetting material which comprises providing complementary mold members having mating cavities and narrow meeting lands about the cavities, heating the mold members to the gelling temperature of the thermosetting material, filling each mold member to the brim with the liquid thermosetting material, depositing the material as aged over the mold cavity surface, removing the excess undeposited liquid material from the mold members by spinning the mold member rapidly about a vertical axis perpendicular to the brim of the mold cavity, assembling the mold members and the deposited material face to face to unite the deposits, applying pressure to the assembled mold members to squeeze excess material out of the space between lands of the molds, heating the assembled molds to set the material forming the hollow article further, removing the clamping pressure, and completing the article.

4. The method for making hollow articles from a liquid plastisol of thermosetting material which comprises providing complementary mold members having mating cavities and narrow meeting lands about the cavities, heating the mold members to the gelling temperature of the thermosetting material, positioning the mold members horizontally and to provide upwardly open mold cavities, filling each mold member to the brim with the liquid plastisol of thermosetting material, depositing the material over the mold cavity surface by transfer of stored heat in the mold member to the thermosetting material in the member adjacent the cavity surface, removing the excess undeposited liquid material from the mold members by rapidly spinning the mold member about a vertical axis, assembling the mold members and the deposited material face to face to unite the deposits, applying pressure to the assembled mold members to squeeze excess material out of the space between lands of the molds, heating the assembled molds to a temperature to further set the material forming the hollow article, removing the clamping pressure, opening the molds, and removing the articles.

5. The method of making hollow articles from a dispersion of plastic material which comprises the steps of providing heated complementary mold members having mating cavities and narrow meeting lands about the cavities, conveying the mold members in succession step by step, filling each mold member to the brim with the material, depositing the material over the mold cavity surface by transfer of heat to the material in the member adjacent the cavity surface, removing the excess undeposited material from the mold members by flow over the lands of the members by spinning the mold member about an axis perpendicular to the brim of the mold cavity, assembling the mold members and the deposited material face to face to unite the deposits, applying pressure to the assembled mold members to squeeze material out of the space between lands of the molds, heating the assembled molds to a temperature to set the material forming the hollow article further, removing the clamping pressure, opening the molds, and removing the articles.

6. The method for making hollow articles from a liquid dispersion of thermosetting material which comprises providing heated complementary mold members having mating cavities and narrow meeting lands about the cavities, filling the mold members to the brim with the liquid dispersion and depositing the thermosetting material over the mold cavity surface, removing the excess undeposited material from the mold members by uniform flow over the lands thereof, the lands of the mold members having material deposited thereon solely as the excess material flows thereover, assembling the mold members with the deposited material therein to form a hollow enclosed cavity and to unite the deposits, applying pressure to the assembled mold members to squeeze excess material out of the space between the lands of the molds, heating the assembled molds to a temperature to set the material further, removing the clamping pressure, opening the molds, and removing the articles.

7. The method for making hollow articles from a liquid dispersion of thermosetting material which comprises providing complementary mold members having mating cavities and narrow meeting lands about the cavities, conveying the mold members in horizontal positions with upwardly facing open mold cavities in succession step by step, heating the mold members to at least the gelling temperature of the thermosetting material, filling each mold member to the brim with the thermosetting material, retaining the mold members filled with the thermosetting material and depositing the material over the mold cavity surface by transfer of heat to the thermosetting material in the member adjacent the cavity surface, removing the excess undeposited material from the mold members by spinning the mold member rapidly about a vertical axis perpendicular to the brim of the mold cavity, assembling the mold members and the deposited material face to face to unite the deposits, applying pressure to the assembled mold members to squeeze excess material out of the space between lands of the molds, heating the assembled molds to set the material forming the hollow article further, tearing the rind of excess material from the clamped mold members, removing the clamping pressure, opening the molds, and removing the articles.

8. The method of making hollow articles from a plastisol of plastic material which comprises providing a pair of complementary mold members having mating cavities and meeting lands about the cavities, positioning the mold members on vertical axes with their cavities facing upwardly, filling each mold member to the brim with the plastisol, depositing a layer of the plastisol as a gel over the mold cavity surface by transfer of heat to the material, removing the excess undeposited plastisol from the mold members by spinning them on vertical axes, assembling the pair of mold members face to face to unite the gelled layers therein to form a hollow article, heating the assembled mold members to set the material forming the hollow article further, opening the mold members when the material therein can be safely handled, and removing the hollow article.

9. That method of making hollow articles from a liquid plastisol in a pair of complementary semi-spherical molds having mating cavities and meeting lands about the cavities, the method comprising the steps of positioning the molds on vertical axes with their cavities facing upwardly, filling each mold to the brim with the plastisol, depositing layers of the plastisol as a gel over the mold cavity surfaces by transfer of heat to the material, spinning out the excess undeposited plastisol from the molds by rotating them on vertical axes to cause at least substantially uniform flow of the plastisol over the mold lands, the molds containing sufficient heat to produce some gel of plastisol on the mold lands, assembling the pair of molds with their meeting lands in contact to unite the deposited layers therein to form a hollow article, heating the assembled molds to a temperature to set the material forming the hollow article further, cooling the molds, opening the molds, and removing the hollow article.

(References on following page)

References Cited in the file of this patent

UNITED STATES PATENTS

| | | |
|---|---|---|
| 1,941,802 | Howell | Jan. 2, 1934 |
| 2,525,965 | Smith | Oct. 17, 1950 |
| 2,572,511 | Palmqvist | Oct. 23, 1951 |
| 2,629,131 | Martin et al. | Feb. 24, 1953 |
| 2,696,024 | Mobley et al. | Dec. 7, 1954 |
| 2,736,925 | Heisler et al. | Mar. 6, 1956 |
| 2,834,986 | Bailey et al. | May 20, 1958 |
| 2,894,746 | Chupa | July 14, 1959 |
| 2,935,320 | Chupa | May 3, 1960 |
| 2,938,237 | Kern et al. | May 31, 1960 |
| 2,958,907 | Mumford et al. | Nov. 8, 1960 |
| 2,961,703 | Pinotti | Nov. 29, 1960 |
| 2,967,329 | Friedland | Jan. 10, 1961 |

FOREIGN PATENTS

| | | |
|---|---|---|
| 466,981 | Canada | Aug. 1, 1950 |